US011136481B2

(12) United States Patent
Yoshida et al.

(10) Patent No.: US 11,136,481 B2
(45) Date of Patent: Oct. 5, 2021

(54) POLYURETHANE RESIN-FORMABLE COMPOSITION FOR MEMBRANE SEAL MATERIAL, AND MEMBRANE SEAL MATERIAL AND MEMBRANE MODULE USING SAID COMPOSITION

(71) Applicant: TOSOH CORPORATION, Yamaguchi (JP)

(72) Inventors: Kouji Yoshida, Yokkaichi (JP); Mitsushige Ikemoto, Yokkaichi (JP); Futoshi Oota, Yokkaichi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/633,148

(22) PCT Filed: Jul. 25, 2018

(86) PCT No.: PCT/JP2018/027798
§ 371 (c)(1),
(2) Date: Jan. 22, 2020

(87) PCT Pub. No.: WO2019/022103
PCT Pub. Date: Jan. 31, 2019

(65) Prior Publication Data
US 2020/0199424 A1  Jun. 25, 2020

(30) Foreign Application Priority Data

Jul. 25, 2017 (JP) .............................. JP2017-143363
Jul. 24, 2018 (JP) .............................. JP2018-138313

(51) Int. Cl.
*C09K 3/10* (2006.01)
*B01D 63/04* (2006.01)
(Continued)

(52) U.S. Cl.
CPC ............ *C09K 3/1021* (2013.01); *B01D 63/04* (2013.01); *B01D 65/003* (2013.01); *C08G 18/12* (2013.01);
(Continued)

(58) Field of Classification Search
CPC .. C08G 18/3206; C08G 18/12; C08G 18/222; C08G 18/3819; C08G 18/4825;
(Continued)

(56) References Cited

U.S. PATENT DOCUMENTS 4,598,136 A   7/1986 Wick
4,931,595 A   6/1990 Rasshofer
(Continued)

FOREIGN PATENT DOCUMENTS

FR   1 410 546 A   9/1965
JP   H07-213871 A   8/1995
(Continued)

OTHER PUBLICATIONS

India Examination Report for India Patent Application No. 202047004112, Examination Report dated Jul. 4, 2020, with translation, 5 pages.
(Continued)

*Primary Examiner* — Ellen M McAvoy
(74) *Attorney, Agent, or Firm* — Squire Patton Boggs (US) LLP

(57) ABSTRACT

Provided are a composition for forming a polyurethane resin used for a membrane sealing material, the composition having low viscosity and contributing to the formation of a membrane sealing material having reduced elution of low-molecular weight reaction products; and a membrane sealing material and a membrane module using this composition. Disclosed is a composition for forming a polyurethane resin
(Continued)

used for a membrane sealing material, the composition including a base agent (A) and a curing agent (B), wherein the base agent (A) comprises an isocyanate group-terminated prepolymer (A1), the isocyanate group-terminated prepolymer (A1) is a reaction product between an isocyanate group-containing compound (a1) and an active hydrogen-containing compound (a2), the base agent (A) comprises diphenylmethane diisocyanate, the monomer content of the diphenylmethane diisocyanate is 35% by mass or less, and the curing agent (B) comprises a compound (b1) represented by Formula (1). In Formula (1), R represents an alkyl group having 2 or more carbon atoms.

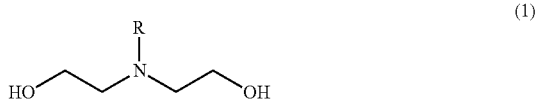

(1)

19 Claims, 1 Drawing Sheet

(51) Int. Cl.

| | | |
|---|---|---|
| B01D 65/00 | (2006.01) | |
| C08G 18/12 | (2006.01) | |
| C08G 18/22 | (2006.01) | |
| C08G 18/32 | (2006.01) | |
| C08G 18/38 | (2006.01) | |
| C08G 18/48 | (2006.01) | |
| C08G 18/67 | (2006.01) | |
| C08G 18/76 | (2006.01) | |

(52) U.S. Cl.
CPC ....... *C08G 18/222* (2013.01); *C08G 18/3206* (2013.01); *C08G 18/3819* (2013.01); *C08G 18/4825* (2013.01); *C08G 18/6755* (2013.01); *C08G 18/7671* (2013.01); *B01D 2313/04* (2013.01); *C09K 2200/065* (2013.01)

(58) Field of Classification Search
CPC ............ C08G 18/6755; C08G 18/7671; C10G 18/3819; C09K 3/1021; C09K 2200/065; B01D 63/04; B01D 65/003; B01D 2313/04
See application file for complete search history.

(56) References Cited

U.S. PATENT DOCUMENTS

| | | | | |
|---|---|---|---|---|
| 2010/0170843 | A1* | 7/2010 | Yamato | C08G 18/4816 210/323.1 |
| 2013/0197114 | A1* | 8/2013 | Burdeniuc | C08G 18/302 521/128 |
| 2016/0159965 | A1* | 6/2016 | Uchida | C08G 18/0823 524/839 |
| 2018/0079853 | A1* | 3/2018 | Takemoto | C08G 18/1833 |
| 2019/0256708 | A1* | 8/2019 | Nishikawa | C08G 18/4829 |
| 2019/0367668 | A1* | 12/2019 | Oota | C08G 18/36 |

FOREIGN PATENT DOCUMENTS

| | | |
|---|---|---|
| JP | H11-1322881 A | 11/1999 |
| JP | 2000-297134 A | 10/2000 |
| JP | 4264976 B2 | 5/2009 |
| JP | 5489066 B2 | 5/2014 |
| JP | 2015-142908 A | 8/2015 |
| WO | WO 2011/074238 A1 | 6/2011 |
| WO | WO 2017/006650 A1 | 1/2017 |
| WO | WO 2017/111043 A1 | 6/2017 |

OTHER PUBLICATIONS

International Search Report and Writtten Opinion for PCT International Application No. PCT/JP2018/027798, search report dated Sep. 11, 2018, with translation, 7 pages.
International Preliminary Report on Patentability for PCT International Application No. PCT/JP2018/027798, patent report dated Jan. 28, 2020, with translation, 9 pages.
Extended European Search Report for European Patent Application No. 18838987.8, 9 pages, dated Mar. 17, 2021.

* cited by examiner

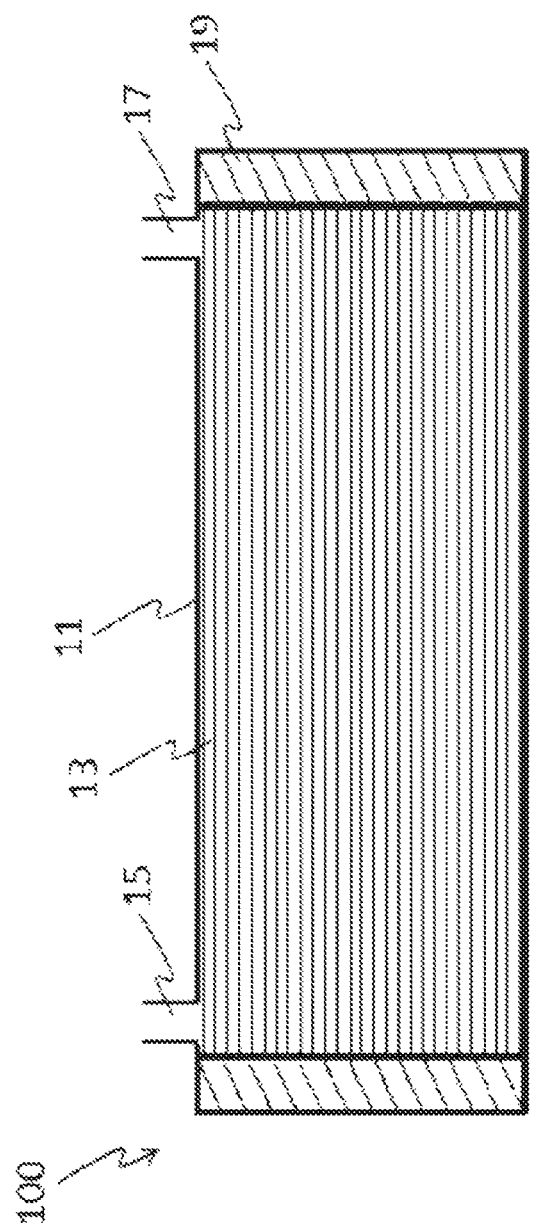

POLYURETHANE RESIN-FORMABLE COMPOSITION FOR MEMBRANE SEAL MATERIAL, AND MEMBRANE SEAL MATERIAL AND MEMBRANE MODULE USING SAID COMPOSITION

CROSS-REFERENCE

This application is a 35 U.S.C. 371 filing of International Application No. PCT/JP2018/027798, filed on Jul. 25, 2018, which claims priority to and the benefit of JP Patent Application No. JP 2018-138313, filed on Jul. 24, 2018, and JP Patent Application No. JP 2017-143363, filed on Jul. 25, 2017, all of which are incorporated verbatim herein by reference in their entirety, including the specifications, drawings, and the claims.

TECHNICAL FIELD

The present disclosure relates to a composition for forming a polyurethane resin used for a membrane sealing material, and a membrane sealing material and a membrane module using this composition.

BACKGROUND ART

In recent year, hollow fiber membrane modules having high packing ratios of hollow fiber membranes have been developed. Therefore, a composition for forming a polyurethane resin used for a membrane sealing material that seals a gap between a membrane and a membrane module is required to have lower viscosity so that the composition can exhibit excellent penetrability that enables easy penetration even to a fine gap.

Diphenylmethane diisocyanate (MDI) is widely used in the compositions for forming a polyurethane resin that is used for membrane sealing materials; however, in a case glycerin is used as a retaining agent for retaining fine pores of hollow fiber membranes, a low-molecular weight reaction product between MDI and glycerin is produced. Since this low-molecular weight reaction product is eluted into the membrane module during use, it is strongly desirable that such production is suppressed.

Patent Literature 1 discloses a polyurethane resin-formable composition for a seal material of a membrane module, the composition including a polyisocyanate component (base agent) comprising an isocyanate group-terminated prepolymer obtained from a reaction product of MDI and castor oil and polymethylene polyphenyl polyisocyanate, and a polyol component (curing agent). According to the polyurethane resin-formable composition for a seal material pertaining to Patent Literature 1, the composition has low viscosity, and the amount of elution of a resulting polyurethane resin is reduced.

CITATION LIST

Patent Literature

Patent Literature 1: Japanese Unexamined Patent Publication No. H7-213871

SUMMARY OF INVENTION

Technical Problem

However, in the composition pertaining to Patent Literature 1, lowering the viscosity is attempted by reacting MDI with castor oil and by adding polymethylene polyphenyl polyisocyanate; nevertheless, the viscosity of the base agent is still high, and there is a further demand for lowering the viscosity. Therefore, the composition pertaining to Patent Literature 1 has a problem that the initial viscosity upon mixing between the base agent and the curing agent is high, and filling defect at the time of molding may occur.

Thus, a composition for forming a polyurethane resin used for a membrane sealing material according to an embodiment of the present invention is directed to provide a composition for forming a polyurethane resin used for a membrane sealing material, which has low viscosity and contributes to the formation of a membrane sealing material having reduced elution of low-molecular weight reaction products.

Another embodiment of the present invention is directed to provide a membrane sealing material and a membrane module, both of which comprise a cured product of the above-mentioned composition for forming a polyurethane resin used for a membrane sealing material.

Solution to Problem

The composition for forming a polyurethane resin used for a membrane sealing material according to an embodiment of the present invention is a composition for forming a polyurethane resin used for a membrane sealing material, comprising a base agent (A) and a curing agent (B), wherein the base agent (A) comprises an isocyanate group-terminated prepolymer (A1), the isocyanate group-terminated prepolymer (A1) is a reaction product between an isocyanate group-containing compound (a1) and an active hydrogen-containing compound (a2), the base agent (A) comprises diphenylmethane diisocyanate, the monomer content of this diphenylmethane diisocyanate is 35% by mass or less, and the curing agent (B) comprises a compound (b1) represented by Formula (1):

[Chem. 1]

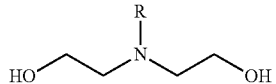

(1)

wherein R represents an alkyl group having 2 or more carbon atoms.

A membrane sealing material according to another embodiment of the present invention comprises a cured product of the above-described composition for forming a polyurethane resin used for a membrane sealing material.

A membrane module according to another embodiment of the present invention comprises:

a main body unit;

a membrane; and a membrane sealing material that seals the gaps between the main body unit and the membrane, wherein the membrane sealing material is the above-described membrane sealing material.

Advantageous Effects of Invention

According to an embodiment of the present invention, a composition for forming a polyurethane resin used for a membrane sealing material, which has low viscosity and producing less eluate of low-molecular weight reaction products, can be provided.

According to another embodiment of the present invention, a membrane sealing material comprising a cured product of the composition for forming a polyurethane resin used for a membrane sealing material described above, and a membrane module can be provided.

BRIEF DESCRIPTION OF DRAWINGS

FIG. 1 is a concept diagram illustrating an example of the configuration of a membrane module according to an embodiment of the present invention.

DESCRIPTION OF EMBODIMENTS

Exemplary embodiments for carrying out the present invention will be described in detail below.

[Composition for Forming a Polyurethane Resin Used for a Membrane Sealing Material]

The composition for forming a polyurethane resin used for a membrane sealing material according to an embodiment of the present invention comprises a base agent (A) containing an isocyanate component; and a curing agent (B) containing a polyol component, in which the base agent (A) comprises an isocyanate group-terminated prepolymer (A1), the isocyanate group-terminated prepolymer (A1) is a reaction product between an isocyanate group-containing compound (a1) and an active hydrogen-containing compound (a2), the base agent (A) comprises diphenylmethane diisocyanate, the monomer content of the diphenylmethane diisocyanate is 35% by mass or less, and the curing agent (B) comprises a compound (b1) represented by Formula (1):

[Chem. 2]

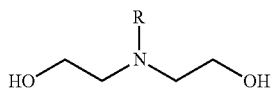
(1)

wherein R represents an alkyl group having 2 or more carbon atoms.

The composition for forming a polyurethane resin used for a membrane sealing material according to another embodiment of the present invention is such that the base agent (A) comprises at least one selected from the group consisting of a mixture of a modified or unmodified diphenylmethane diisocyanate and an isocyanate group-terminated prepolymer (A1-α); and an isocyanate group-terminated prepolymer (A1-β) comprising diphenylmethane diisocyanate as a constituent unit, the isocyanate group-terminated prepolymer (A1-α) is a reaction product between an isocyanate group-containing compound (a1-α) and an active hydrogen-containing compound (a2-α), the isocyanate group-terminated prepolymer (A1-β) is a reaction product between an isocyanate group-containing compound (a1-β) and an active hydrogen-containing compound (a2-β), the monomer content of the diphenylmethane diisocyanate in the base agent (A) is 35% by mass or less, and the curing agent (B) comprises a compound (b1) represented by Formula (1).

<Base Agent (A)>

The base agent (A) comprises an isocyanate group-terminated prepolymer (A1).

Furthermore, the base agent (A) comprises at least one selected from the group consisting of a mixture of a modified or unmodified diphenylmethane diisocyanate and an isocyanate group-terminated prepolymer (A1-α); and an isocyanate group-terminated prepolymer (A1-β) comprising diphenylmethane diisocyanate as a constituent unit.

Therefore, the base agent (A) may contain diphenylmethane diisocyanate in the form of a mixture with an isocyanate group-terminated prepolymer (A1-α), or may contain diphenylmethane diisocyanate in the form of a constituent unit of an isocyanate group-terminated prepolymer (A1-β).

The isocyanate group-terminated prepolymer (A1-α) is an embodiment of an isocyanate group-terminated prepolymer (A1), and is a reaction product between an isocyanate group-containing compound (a1-α) and an active hydrogen-containing compound (a2-α).

The isocyanate group-terminated prepolymer (A1-β) is an embodiment of the isocyanate group-terminated prepolymer (A1), and is a reaction product between an isocyanate group-containing compound (a1-β) and an active hydrogen-containing compound (a2-β).

The isocyanate group-containing compound (a1-α) and the isocyanate group-containing compound (a1-β) are included in the isocyanate group-containing compound (a1). Therefore, in the case of referring to the isocyanate group-containing compound (a1), the isocyanate group-containing compound (a1-α) and the isocyanate group-containing compound (a1-β) are also included therein.

The active hydrogen-containing compound (a2-α) and the active hydrogen-containing compound (a2-β) are included in the active hydrogen-containing compound (a2). Therefore, in the case of referring to the active hydrogen-containing compound (a2), the active hydrogen-containing compound (a2-α) and the active hydrogen-containing compound (a2-β) are included therein.

The isocyanate group-terminated prepolymer (A1-α) and the isocyanate group-terminated prepolymer (A1-β) are included in the isocyanate group-terminated prepolymer (A1). Therefore, in the case of referring to the isocyanate group-terminated prepolymer (A1), the isocyanate group-terminated prepolymer (A1-α) and the isocyanate group-terminated prepolymer (A1-β) are included therein.

<<Isocyanate Group-Containing Compound (a1)>>

The isocyanate group-containing compound (a1) is a compound containing an isocyanate group in the molecule and is not particularly limited. Examples of the isocyanate group-containing compound (a1) include an aliphatic isocyanate having 2 to 18 carbon atoms, an alicyclic isocyanate having 4 to 15 carbon atoms, an aromatic isocyanate having 6 to 20 carbon atoms, and an aromatic aliphatic isocyanate having 8 to 15 carbon atoms.

Here, the number of carbon atoms means the number of carbon atoms excluding the carbon atoms in the isocyanate group, and the same applies hereinbelow.

Examples of the aliphatic isocyanate having 2 to 18 carbon atoms include ethylene diisocyanate, tetramethylene diisocyanate, hexamethylene diisocyanate, dodecamethylene diisocyanate, 1,6,11-undecane triisocyanate, 2,2,4-trimethylhexamethylene diisocyanate, lysine diisocyanate, 2,6-diisocyanate methyl caproate, bis(2-isocyanatoethyl) fumarate, bis(2-isocyanatoethyl) carbonate, and 2-isocyanatoethyl-2,6-diisocyanatohexanoate.

Examples of the alicyclic isocyanate having 4 to 15 carbon atoms include isophorone diisocyanate, dicyclohexylmethane diisocyanate, cyclohexylene diisocyanate, methylcyclohexylene diisocyanate, and bis(2-isocyanatoethyl)-4-cyclohexene-1,2-dicarboxylate.

Examples of the aromatic isocyanate having 6 to 20 carbon atoms include TDI (toluene diisocyanate) such as 2,4-TDI and 2,6-TDI; MDI (methylene diphenylene diisocyanate) such as 4,4'-MDI, 2,4'-MDI, 2,2'-MDI, and mixtures of these; naphthalene diisocyanate; and polymethylene polyphenyl polyisocyanate having three or more benzene rings. Meanwhile, the MDI mentioned herein is unmodified MDI.

Examples of the aromatic aliphatic isocyanate having 8 to 15 carbon atoms include xylylene diisocyanate, α,α,α',α'-tetramethylxylylene diisocyanate, and diisocyanatoethylbenzene.

Furthermore, modification products in which a portion or all of the isocyanate groups in the isocyanate group-containing compounds have been modified may also be mentioned. The modification products are not particularly limited, and examples include modification products obtainable by carrying out modifications such as isocyanurate modification, biuret modification, allophanate modification, uretdione modification, uretoneimine modification, carbodiimide modification, oxazolidone modification, amide modification, and imide modification. Therefore, modified MDI's comprise various modification products such as carbodiimide-modified MDI and allophanate-modified MDI.

Among these, an aromatic isocyanate or a modification product in which a portion of the isocyanate groups carried by an aromatic isocyanate has been modified is preferred. MDI or a modification product in which a portion of MDI has been modified is more preferred. Particularly, MDI or a modification product in which a portion of MDI has been allophanate-modified is particularly preferred. By using a compound comprising these isocyanate groups, a cured resin having satisfactory physical properties (for example, mechanical strength such as mixing viscosity and hardness) that are required for a membrane sealing material can be formed.

Meanwhile, a modified or unmodified MDI, which is an isocyanate group-containing compound (a1-β), reacts with an active hydrogen-containing compound (a2-β), and a reaction product is formed. That is, the modified or unmodified MDI can be a constituent unit of an isocyanate group-terminated prepolymer (A1-β).

Furthermore, the modified or unmodified MDI can constitute the mixture together with an isocyanate group-terminated prepolymer (A1-α).

<<Active Hydrogen-Containing Compound (a2)>>

The active hydrogen-containing compound (a2) is not particularly limited as long as it is a compound containing active hydrogen. Examples of the active hydrogen-containing compound (a2) include monoalcohols such as an aliphatic monoalcohol, an aromatic monoalcohol, an alicyclic monoalcohol, an aromatic aliphatic monoalcohol, and a polyoxypropylene glycol monoalkyl ether; and polyols such as castor oil, a castor oil-based polyol, a low-molecular weight polyol, a polyether-based polyol, a polyester-based polyol, a polylactone-based polyol, and a polyolefin-based polyol.

The active hydrogen-containing compound (a2) is preferably an alkyl alcohol having 10 or more carbon atoms, and more preferably an alkyl alcohol having 10 to 105 carbon atoms.

Examples of the aliphatic monoalcohol include aliphatic monoalcohols such as methanol, ethanol, 1- and 2-propanol, 1- and 2-butanol, 1-pentanol, 1-hexanol, 2-methyl-1-pentanol, 4-methyl-2-pentanol, 2-ethyl-1-butanol, 1-heptanol, 1-octanol, 2-octanol, 2-ethylhexanol, 3,5-dimethyl-1-hexanol, 2,2,4-trimethyl-1-pentanol, 1-nonanol, 2,6-dimethyl-4-heptanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-hexacosanol, 1-heptatricontanol, 1-oleyl alcohol, and 2-octyldodecanol; and mixtures of these.

The number average molecular weight of the aliphatic monoalcohol is preferably from 32 to 1,500, and more preferably from 100 to 1,000. When the molecular weight is in this range, the molding processability and adhesive strength of the polyurethane resin are excellent.

Examples of the aromatic monoalcohol include phenol and cresol.

Examples of the alicyclic monoalcohol include cyclohexanol and methylcyclohexanol.

Examples of the aromatic aliphatic monoalcohol include benzyl alcohol.

Examples of the polyoxypropylene glycol monoalkyl ether include reaction products between the above-described aliphatic monoalcohols and polyoxypropylene glycol, and examples include polyoxypropylene methyl ether, polyoxypropylene ethyl ether, polyoxypropylene butyl ether, polyoxypropylene-2-ethylhexyl ether, polyoxypropylene oleyl ether, polyoxypropylene-2-octyl dodecaether, and mixtures of these.

The number average molecular weight of the polyoxypropylene glycol monoalkyl ether is preferably from 90 to 1,500. Meanwhile, from the viewpoint that the molding processability and adhesive strength of the polyurethane resin are excellent, the number average molecular weight thereof is more preferably from 150 to 1,000.

The castor oil-based polyol may be a linear or branched castor oil-based polyol obtainable by a reaction between castor oil or a castor oil fatty acid and at least one polyol selected from the group consisting of a low-molecular weight polyol and a polyether polyol. More specifically, examples include diglyceride and monoglyceride of a castor oil fatty acid; mono-, di-, and triesters of a castor oil fatty acid and a trimethylolalkane; and mono-, di-, and triesters of a castor oil fatty acid and polypropylene glycol.

Meanwhile, a main component of castor oil is triglyceride of ricinoleic acid, and hydrogenated castor oil is included in the castor oil. Furthermore, a main component of a castor oil fatty acid is ricinoleic acid, and a hydrogenated castor oil fatty acid is included in the castor oil fatty acid.

Furthermore, examples of the trimethylolalkane include trimethylolmethane, trimethylolethane, trimethylolpropane, trimethylolbutane, trimethylolpentane, trimethylolhexane, trimethylheptane, trimethyloloctane, trimethylolnonane, and trimethyloldecane.

The number average molecular weight of the castor oil-based polyol is preferably from 400 to 3,000, and more preferably from 500 to 2,500. By using a castor oil-based polyol having a number average molecular weight of from 400 to 3,000, a cured resin having excellent physical properties, particularly mechanical characteristics, that are required for a membrane sealing material can be formed.

The average hydroxyl group value of castor oil and the castor oil-based polyol is preferably from 20 mg KOH/g to 300 mg KOH/g, and more preferably from 40 mg KOH/g to 250 mg KOH/g. By using a castor oil-based polyol having an average hydroxyl group value of from 20 mg KOH/g to 300 mg KOH/g, a cured resin having excellent physical properties, particularly mechanical characteristics, that are required for a membrane sealing material can be formed. Furthermore, an enhancement in the productivity of a membrane sealing material, and moreover, the productivity of a hollow fiber membrane module, can also be promoted.

Examples of the low-molecular weight polyol include divalent polyols such as ethylene glycol, diethylene glycol, propylene glycol, 1,2-, 1,3-, or 1,4-butanediol, 1,5-pentanediol, 3-methyl-1,5-pentanediol, 1,6-hexanediol, 1,8-octanediol, 1,10-decanediol, neopentyl glycol, and hydrogenated bisphenol A; and trivalent to octavalent polyols such as glycerin, trimethylolpropane, hexanetriol, pentaerythritol, sorbitol, and sucrose. The number average molecular weight of the low-molecular weight polyol is preferably from 50 to 200.

Examples of the polyether-based polyol include an alkylene oxide (an alkylene oxide having 2 to 8 carbon atoms, for example, ethylene oxide, propylene oxide, or butylene oxide) adduct of above-mentioned low-molecular weight polyol, and a ring-opening polymerization product of an alkylene oxide. Specifically, examples include polypropylene glycol, polyethylene glycol, polytetramethylene ether glycol, or a copolymerization product of ethylene oxide and propylene oxide. From the viewpoint of having excellent molding processability at the time of production of a membrane sealing material, the number average molecular weight of the polyether-based polyol is preferably from 200 to 7,000, and more preferably from 500 to 5,000.

Examples of the polyester-based polyol include a polyester-based polyol obtainable by condensation polymerization between a polycarboxylic acid and a polyol.

Examples of the polycarboxylic acid used for the polyester polyol include aliphatic saturated and unsaturated polycarboxylic acids and aromatic polycarboxylic acids, such as adipic acid, azelaic acid, dodecanedioic acid, maleic acid, fumaric acid, itaconic acid, dimerized linoleic acid, phthalic acid, isophthalic acid, and terephthalic acid.

Furthermore, examples of the polyol used for the polyester-based polyol include the above-mentioned low-molecular weight polyols and polyether-based polyols.

The number average molecular weight of the polyester-based polyol is preferably from 200 to 5,000, and more preferably from 500 to 3,000. By using a polyester-based polyol having a number average molecular weight of from 200 to 5,000, the molding processability at the time of forming a membrane sealing material is especially excellent.

Examples of the polylactone-based polyol include polyols obtainable by subjecting ε-caprolactone, α-methyl-ε-caprolactone, ε-methyl-ε-caprolactone, β-methyl-δ-valerolactone, and the like to addition polymerization using a polymerization initiator such as a glycol or a triol in the presence of a catalyst such as an organometallic compound, a metal chelate compound, or a fatty acid metal acyl compound. The number average molecular weight of the polylactone-based polyol is preferably from 200 to 5,000, and more preferably from 500 to 3,000. By using a polylactone-based polyol having a number average molecular weight of from 200 to 5,000, the molding processability at the time of forming a membrane sealing material is especially excellent.

The polyolefin-based polyol may be a polybutadiene-based polyol in which a hydroxyl group has been introduced into the terminals of polybutadiene or a copolymer of butadiene and styrene or acrylonitrile. In addition to these, a polyether ester polyol obtainable by subjecting a polyester having a carboxyl group and a hydroxyl group at the terminals to an addition reaction with an alkylene oxide, for example, ethylene oxide or propylene oxide may also be mentioned.

Among these, the active hydrogen-containing compound (a2) is preferably castor oil or a castor oil-based polyol.

<<Production Method for Isocyanate Group-Terminated Prepolymer (A1)>>

The isocyanate group-terminated prepolymer (A1) is preferably, for example, a prepolymer obtained by subjecting an isocyanate group-containing compound (a1) and an active hydrogen-containing compound (a2) to urethanization or carbodiimidization, or a prepolymer obtained by adding, after carrying out the urethanization reaction, a predetermined amount of a catalyst (a3) to achieve allophanation, and terminating the reaction by means of a catalyst poison (a4).

<<Catalyst (a3)>>

Examples of the catalyst (a3) include acetylacetone zinc; metal carboxylates of zinc, lead, tin, copper, cobalt, and the like with carboxylic acids; mixtures of these; tertiary amines, tertiary aminoalcohols, quaternary ammonium salts, and mixtures of these.

The amount of addition of the catalyst (a3) is preferably within the range of from 1 ppm to 500 ppm, and more preferably from 5 ppm to 300 ppm. When the amount of addition is 1 ppm or more, the reaction occurs rapidly, and when the amount of addition is 500 ppm or less, it is preferable because coloration of the prepolymer is suppressed more satisfactorily.

<<Catalyst Poison (a4)>>

The catalyst poison (a4) is preferably an acidic substance. Examples of the catalyst poison (a4) include anhydrous hydrogen chloride, sulfuric acid, phosphoric acid, a monoalkyl sulfuric acid ester, an alkyl sulfonic acid, an alkyl benzenesulfonic acid, a mono- or dialkyl phosphoric acid ester, benzoyl chloride, and a Lewis acid. Regarding the amount of addition of the catalyst poison (a4), it is preferable that the catalyst poison (a4) is added in one equivalent or more with respect to the number of moles of the catalyst (a3), and it is preferable that the catalyst poison (a4) is added in an amount of from 1.0-fold molar equivalent to 1.5-fold molar equivalent with respect to the number of moles of the catalyst (a3).

<<Isocyanate Group Content>>

The isocyanate group content of the base agent (A) is preferably from 3% by mass to 30% by mass, more preferably from 5% by mass to 28% by mass, and particularly preferably from 10% by mass to 26% by mass. When the isocyanate group content is in these ranges, the molding processability and adhesive strength of the polyurethane resin are excellent.

<<MDI Monomer Content>>

Furthermore, the MDI monomer content in the base agent (A) is preferably 35% by mass or less, more preferably 33% by mass or less, and particularly preferably 30% by mass or less, in order to reduce low-molecular weight reaction products between MDI and glycerin.

<<Reaction Temperature>>

Regarding the urethanization reaction, it is preferable that the reaction is carried out in a temperature range of from 40° C. to 80° C. until the target NCO content is obtained. When the temperature is 40° C. or higher, crystal precipitation of monomer MDI can be suppressed more satisfactorily, and when the temperature is 80° C. or lower, production of side reaction products can be further suppressed.

Regarding the allophanation reaction, it is preferable that the reaction is carried out in a temperature range of from 90° C. to 130° C. until the target NCO content is obtained. When the temperature is 90° C. or higher, the reaction occurs more rapidly, and when the temperature is 130° C. or lower, production of side reaction products can be further suppressed.

<Curing Agent (B)>

The curing agent (B) comprises a compound (b1) represented by Formula (1):

[Chem. 3]

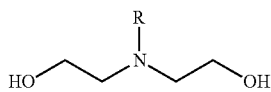
(1)

In Formula (1), R represents an alkyl group having 2 or more carbon atoms. When the number of carbon in R is 1, the HLB (details will be described below) is increased, the compatibility with glycerin is enhanced, and the elution performance is deteriorated.

When the curing agent (B) is used, moldability, adhesiveness, and heat resistance become especially excellent.

<<Compound (b1)>>

Examples of the compound (b1) represented by Formula (1) include butyl diethanolamine, hexyl diethanolamine, octyl diethanolamine, lauryl diethanolamine, myristyl diethanolamine, cetyl diethanolamine, and stearyl diethanolamine, which are linear or branched.

The content of the compound (b1) in the curing agent (B) is preferably 1% by mass or more, more preferably from 1% by mass to 40% by mass, even more preferably from 3% by mass to 30% by mass, and particularly preferably from 4% by mass to 25% by mass. When the content is 1% by mass or more, the viscosity is lowered, and elution can be further suppressed. When the content is 40% by mass or less, since a more appropriate amount of resin crosslinking occurs, elution can be further suppressed.

Furthermore, the number of carbon in R in Formula (1) is preferably 6 to 24, more preferably 8 to 20, and particularly preferably 10 to 18. When the number of carbon in R is in this range, since the compatibility with glycerin can be further suppressed, elution can be further suppressed, and also, since the content of nitrogen that enhances curability is not significantly decreased, rapid curability is further improved.

It is preferable that the curing agent (B) comprises the compound (b1); at least one polyol (b2) selected from the group consisting of castor oil and a castor oil-based polyol; and a hydroxyl group-containing amine-based compound (b3) other than the compound (b1).

<<Polyol (b2)>>

The at least one polyol (b2) selected from the group consisting of castor oil and a castor oil-based polyol is not particularly limited; however, it is preferable that the polyol (b2) is at least one selected from castor oil and a castor oil-based modified polyol mentioned as the active hydrogen-containing compound (a2).

<<Hydroxyl Group-Containing Amine-Based Compound (b3)>>

Examples of the hydroxyl group-containing amine-based compound (b3) include a low-molecular weight polyamine and a low-molecular weight aminoalcohol. More specifically, examples include amine-based compounds, including oxyalkylated derivatives of amino compounds, such as N,N,N',N'-tetrakis[2-hydroxypropyl]ethylenediamine and N,N,N',N'-tetrakis[2-hydroxyethyl]ethylenediamine, which are adducts of propylene oxide or ethylene oxide of ethylenediamine; and aminoalcohol derivatives such as mono-, di-, and triethanolamines. Among these, propylene oxide or ethylene oxide adducts of amino compounds such as ethylenediamine are preferred, and N,N,N',N'-tetrakis[2-hydroxypropyl]ethylenediamine is particularly preferred. By using N,N,N',N'-tetrakis[2-hydroxypropyl]ethylenediamine, the processability at the time of molding is further enhanced, and also, elution can be further suppressed.

<<(Mb2)/(Mb3)>>

In the curing agent (B), the mass ratio (Mb2)/(Mb3), that is the ratio of the content Mb2 of the polyol (b2) to the content Mb3 of the hydroxyl group-containing amine-based compound (b3), is preferably from 70/30 to 90/10, and more preferably from 72/28 to 87/13. In a case in which the mass ratio (Mb2)/(Mb3) is 70/30 or higher, reactivity is further improved, and excessive lowering of the hardness of the resulting seal material can be further suppressed. In a case in which the mass ratio (Mb2)/(Mb3) is 90/10 or lower, since the reactivity does not become too high, the fillability being impaired by the initial viscosity increase can be further suppressed, and also, excessive increase in the hardness of the resulting membrane sealing material can be further suppressed.

<<Active Hydrogen-Containing Compound (b4)>>

In the curing agent (B), an active hydrogen-containing compound (hereinafter, referred to as "active hydrogen-containing compound (b4)") may be incorporated, which is different from the polyol (b2) and the hydroxyl group-containing amine-based compound (b3). As the active hydrogen-containing compound (b4), various polyols mentioned as the active hydrogen-containing compound (a2) can be used.

In the curing agent (B), the mass ratio (Mb2)/(Mb4), that is the ratio of the content Mb2 of the polyol (b2) to the content Mb4 of the active hydrogen-containing compound (b4), is preferably from 50/50 to 100/0, and particularly preferably 100/0. That is, it is particularly preferable that the curing agent (B) is composed only of the compound (b1), the polyol (b2), and the hydroxyl group-containing amine-based compound (b3).

Furthermore, regarding the mass ratio in the case of considering the hydroxyl group-containing amine-based compound (b3), from the viewpoints of curability and fillability, the mass ratio {(Mb2)+(Mb4)}/(Mb3) is preferably from 70/30 to 90/10, and more preferably from 72/28 to 87/13.

<<Hydrophilic-Lipophilic Balance (HLB)>>

In the present embodiment, in order to reduce the elution of low-molecular weight reaction products of MDI and glycerin, a hydrophobic alkyl group is incorporated for the purpose of lowering the hydrophilicity of the curing agent (B) that contains a hydroxyl group and has high hydrophilicity. The organic value (OV) and the inorganic value (IV) are calculated from the chemical structure, and the HLB can be determined from the following calculation formula. Meanwhile, the hydrophilicity-hydrophobicity of the curing agent (B) is disclosed using the HLB that will be described below. A higher HLB shows hydrophilicity, and a lower HLB shows hydrophobicity.

$$HLB = (\Sigma \text{ Inorganicity}/\Sigma \text{ Organicity}) \times 10 \qquad \text{[Math. 1]}$$

Furthermore, specific examples of the inorganic group and inorganicity (hydrophilicity) thereof are shown in Table 1, and specific examples of the organic and inorganic group and inorganicity (hydrophilicity) and organicity (hydrophobicity) thereof are shown in Table 2.

In Table 1, Φ represents an alkyl group or a phenyl group; and R represents an alkyl group.

TABLE 1

| Inorganic group | Inorganicity (hydrophilicity) |
|---|---|
| —CONH— | 200 |
| —OH | 100 |
| —N < (—NH$_2$, —NHφ, —Nφ$_2$) | 70 |
| —COOR | 60 |
| —O— | 20 |
| Benzene nucleus (general aromatic monocyclic ring) | 15 |
| (—OCH$_2$CH$_2$)— | 75 |
| Double bond | 2 |

TABLE 2

| Organic and inorganic group | Organicity (hydrophobicity) | Inorganicity (hydrophilicity) |
|---|---|---|
| —NCO | 30 | 30 |
| iso-branch | −10 | 0 |
| tert-branch | −20 | 0 |
| > C < (the number of carbon) | 20 | 0 |

The HLB of the curing agent (B) is preferably 9.0 or less, more preferably 8.8 or less, and particularly preferably 8.6 or less.

<Viscosity>

With regard to the composition for forming a polyurethane resin used for a membrane sealing material, when the viscosity after a lapse of 60 seconds from the time point of initiating mixing of the base agent (A) and the curing agent (B) is designated as mixing viscosity, the mixing viscosity is preferably from 400 mPa·s to 1,900 mPa·s, and more preferably from 500 mPa·s to 1,800 mPa·s. Meanwhile, in the present disclosure, a low viscosity means that the mixing viscosity is 1,900 mPa·s or less.

The composition for forming a polyurethane resin used for a membrane sealing material according to an embodiment of the present invention has satisfactory rapid curability and has excellent castability at low viscosity, and a polyurethane resin having a sufficiently small amount of elution of low-molecular weight reaction products of MDI and glycerin, and a membrane sealing material can be obtained.

<Membrane Sealing Material>

A membrane sealing material according to an embodiment of the present invention comprises a cured product of the above-described composition for forming a polyurethane resin used for a membrane sealing material.

The membrane sealing material can be suitably formed by reacting and curing an isocyanate component that constitutes the base agent (A) and a polyol component that constitutes the curing agent (B) under the temperature conditions of from 0° C. to 100° C., preferably from 20° C. to 80° C., and more preferably from 30° C. to 60° C. When the membrane sealing material is molded in a high temperature region, shortening of the gelation time is enabled; however, since molding shrinkage is liable to occur, the reaction temperature can be lowered by adding a catalyst, and molding shrinkage can be suppressed.

<Membrane Module>

A membrane module according to an embodiment of the present invention comprises: a main body unit; a membrane; and a membrane sealing material that seals the gaps between the main body unit and the membrane, and the membrane sealing material is the above-mentioned membrane sealing material.

Next, the membrane module according to an embodiment of the present invention will be explained in more detail with reference to the drawings.

FIG. 1 is a concept diagram illustrating an example of the configuration of the membrane module according to an embodiment of the present invention.

A membrane module (hollow fiber membrane module) 100 illustrated in FIG. 1 comprises a housing (main body unit) 11, and a plurality of hollow fiber membranes (membranes) 13 is packed inside thereof. For example, in the case of a hollow fiber membrane module used as a dialyzer, several thousand to several ten thousand pieces of hollow fiber membranes are packed therein.

The housing 11 has a cylindrical shape. The two ends inside the housing 11 (both right and left ends in FIG. 1) are respectively provided with a membrane sealing material 19. The membrane sealing material seals by embedding the gaps between hollow fiber membranes 13 and the gaps between the hollow fiber membranes 13 and the inner walls of the housing 11, and also bundles a plurality of lines of hollow fiber membranes 13.

Furthermore, on a lateral side of the housing 11, a first fluid inlet port 15 and a first fluid outlet port 17 are provided, and via these, a first fluid (a gas or a liquid) flows in and out of the housing 11. The first fluid that has flowed in through the first fluid inlet port 15 passes through the gaps between the plurality of hollow fiber membranes 13 (external parts of the hollow fiber membranes) packed inside the housing 11 while coming into touch with the hollow fiber membranes and is discharged through the first fluid outlet port 17. Meanwhile, since the membrane sealing material 19 is not present inside the hollow fiber membranes 13, inside the hollow fiber membranes 13, a second fluid (a gas or a fluid) flows in and out through a second inlet port (one end side) and a second outlet port (the other end side) provided at a cap member that is not illustrated in the diagram. Then, as the first fluid and the second fluid come into contact with each other through the hollow fiber membranes 13, mass transfer occurs from one of the fluids into the other fluid (or further from the other fluid into the one fluid). For example, in the case of a hollow fiber membrane type dialyzer, as a dialysate and blood come into contact with each other, waste materials or excess water in the blood migrate into the dialysate.

Meanwhile, the membrane module 100 illustrated in FIG. 1 comprises the plurality of hollow fiber membranes 13 and is configured such that the membrane sealing material 19 seals the gaps at two ends of those hollow fiber membranes; however, the membrane module according to the present embodiment is not limited to such a configuration. For example, a plurality of membranes or a single membrane, the membranes having various shapes such as a flat membrane and a spiral membrane, may be used. Furthermore, the membrane sealing material is not limited to the configuration of being provided at the two ends of a membrane, and the membrane sealing material may be provided at a portion of the membrane only (one end if the membrane is in the form of hollow fibers), or may be provided at both ends of the membrane, for example, over the entire outer periphery of the flat membrane. Furthermore, the membrane sealing material may be provided at a portion other than the ends of the membrane and seal the membrane. Furthermore, the housing 11 of the membrane module 100 illustrated in FIG.

1 has a cylindrical shape; however, the shape may be any arbitrary shape other than a cylindrical shape.

The membrane module 100 can be produced by sealing the mutual gaps of the hollow fiber membranes 13 at the ends of a bundle of the plurality of hollow fiber membranes 13 using the composition for forming a polyurethane resin used for a membrane sealing material described above, curing the composition, and forming the above-mentioned membrane sealing material (the mutual gaps of the hollow fiber membranes are sealed by this membrane sealing material.).

In the membrane module according to an embodiment of the present invention, since the generation of an extract is satisfactorily suppressed, the membrane module can be suitably used as a module for medical use or a water treatment use. Specific examples of the membrane module include a blood plasma separation apparatus, an artificial lung, an artificial kidney, an artificial liver, and a domestic or industrial water treatment apparatus.

Hereinafter, more specific embodiments of the present invention are the following [1] to [9].

[1]: A composition for forming a polyurethane resin used for a membrane sealing material, comprising a base agent (A) and a curing agent (B), wherein the base agent (A) comprises an isocyanate group-terminated prepolymer (A1), the isocyanate group-terminated prepolymer (A1) is a reaction product between an isocyanate group-containing compound (a1) and an active hydrogen-containing compound (a2), the base agent (A) comprises diphenylmethane diisocyanate, the monomer content of the diphenylmethane diisocyanate is 35% by mass or less, and the curing agent (B) comprises a compound (b1) represented by Formula (1):

[Chem. 4]

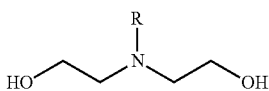

(1)

wherein R represents an alkyl group having 2 or more carbon atoms.

[2]: The composition for forming a polyurethane resin used for a membrane sealing material as described in [1], wherein the isocyanate group-terminated prepolymer (A1) is an allophanate group-containing polyisocyanate.

[3]: A composition for forming a polyurethane resin used for a membrane sealing material, comprising a base agent (A) and a curing agent (B), wherein the base agent (A) comprises:

at least one selected from the group consisting of a mixture of a modified or unmodified diphenylmethane diisocyanate and an isocyanate group-terminated prepolymer (A1-α); and an isocyanate group-terminated prepolymer (A1-β) comprising diphenylmethane diisocyanate as a constituent unit, the isocyanate group-terminated prepolymer (A1-α) is a reaction product between an isocyanate group-containing compound (a1-α) and an active hydrogen-containing compound (a2-α), the isocyanate group-terminated prepolymer (A1-β) is a reaction product between an isocyanate group-containing compound (a1-β) and an active hydrogen-containing compound (a2-β), the monomer content of the diphenylmethane diisocyanate in the base agent (A) is 35% by mass or less, and the curing agent (B) comprises a compound (b1) represented by Formula (1):

[Chem. 5]

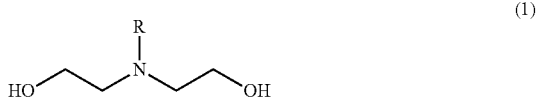

(1)

wherein R represents an alkyl group having 2 or more carbon atoms.

[4]: The composition for forming a polyurethane resin used for a membrane sealing material as described in any one of [1] to [3], wherein R in Formula (1) represents an alkyl group having 6 to 24 carbon atoms.

[5]: The composition for forming a polyurethane resin used for a membrane sealing material as described in any one of [1] to [5], wherein the content of the compound (b1) in the curing agent (B) is 1% by mass or more, and the hydrophilic-lipophilic balance (HLB) of the curing agent (B) is 9.0 or less.

[6]: The composition for forming a polyurethane resin used for a membrane sealing material as described in any one of [1] to [5], wherein the curing agent (B) comprises the compound (b1), at least one polyol (b2) selected from the group consisting of castor oil and a castor oil-based modified polyol, and a hydroxyl group-containing amine-based compound (b3) other than the compound (b1), and the mass ratio (Mb2)/(Mb3), that is the ratio of the content Mb2 of the polyol (b2) to the content Mb3 of the hydroxyl group-containing amine-based compound (b3) is from 70/30 to 90/10.

[8]: The composition for forming a polyurethane resin used for a membrane sealing material as described in any one of [1] to [7], wherein the active hydrogen-containing compound (a2) or the isocyanate group-containing compound (a2-β) is an alkyl alcohol (a2) having 10 or more carbon atoms.

[8]: A membrane sealing material comprising a cured product of the composition for forming a polyurethane resin used for a membrane sealing material as described in any one.

[9]: A membrane module comprising:

a main body unit;

a membrane; and a membrane sealing material sealing the gaps between the main body unit and the membrane, and the membrane sealing material is the membrane sealing material as described in [8].

[10]: The membrane module as described in [9], wherein the membrane is a plurality of lines of hollow fiber membranes, and the membrane sealing material seals at least a portion of the gaps between the main body unit and at least a portion of the plurality of lines of hollow fiber membranes, and the mutual gaps between the plurality of lines of hollow fiber membranes.

EXAMPLES

Hereinafter, the present invention will be described more specifically by way of Examples and Comparative Examples. However, the present invention is not intended to be construed to be limited by any of these examples. Meanwhile, the unit "%" in the following description means "mass %", unless particularly stated otherwise.

The following components were used in Examples and Comparative Examples.

[Base Agent (A)]
a1-1: 4,4'-MDI (MILLIONATE MT manufactured by Tosoh Corporation, isocyanate group content=33.6%)
a1-2: Mixture of 2,4'-MDI and 4,4'-MDI (MILLIONATE NM manufactured by Tosoh Corporation, isocyanate group content=33.6%)
a1-3: Carbodiimide-modification product of 4,4'-MDI (MILLIONATE MTL-C manufactured by Tosoh Corporation, isocyanate group content=28.6%)
a1-4: 2,4-TDI (CORONATE T-100 manufactured by Tosoh Corporation, isocyanate group content=48.2%)
a2-1: Castor oil fatty acid methyl ester (COFA-MD manufactured by Itoh Oil Chemicals Co., Ltd., OHV=160 mg KOH/g)
a2-2: Polypropylene glycol (PP-1000 manufactured by ADEKA Corporation, OHV=111 mg KOH/g)
a2-3: 2-Octyldodecanol (KALCOL 200GD manufactured by Kao Corporation)
a2-4: Partially dehydrated castor oil (HS2G-120 manufactured by Hokoku Corporation, OHV=120 mg KOH/g)
a2-5: Castor oil (URIC H-30 manufactured by Itoh Oil Chemicals Co., Ltd., OHV=160 mg KOH/g)
a2-6: Isotridecanol (manufactured by KH Neochem Co., Ltd., OHV=280 mg KOH/g, the number of carbon: 13)
a2-7: Castor oil-based diol (URIC V-403 manufactured by Itoh Oil Chemicals Co., Ltd., OHV=160 mg KOH/g)
a2-8: Esterification product of castor oil fatty acid and polypropylene glycol (compound obtained by the following Diol Synthesis Example 1, OHV=114 mg KOH/g)
a2-9: 2-Ethylhexanol (octanol manufactured by KH Neochem Co., Ltd., OHV=430 mg KOH/g)
a2-10: Polyoxypropylene glycol mono-2-ethylhexyl ether ethyl (LEOCON 1015H manufactured by LION SPECIALTY CHEMICALS CO., LTD., OHV=70 mg KOH/g)
a3: Zinc acetylacetonate (manufactured by Tokyo Chemical Industry Co., Ltd.)
a4: Benzoyl chloride (manufactured by Tokyo Chemical Industry Co., Ltd.)

<Diol Synthesis Example 1>

Into a four-necked flask having a capacity of 1 liter and combine with a stirrer, a thermometer, a heating apparatus, and a distillation tower, 596 parts by mass of ricinoleic acid (CO-FA, manufactured by Itoh Oil Chemicals Co., Ltd.) and 400 parts by mass of a polypropylene glycol (manufactured by ADEKA Corporation) having a number average molecular weight of 400 were introduced, and while the temperature was increased under a nitrogen gas stream at normal pressure at 110° C. for 2 hours at a proportion of 10° C./hour, the flask was heated to 190° C. A reaction was further carried out for 2 hours at 190° C., and water was distilled off. Next, 0.05 parts by mass of tetrabutyl titanate (TBT-100 manufactured by KATAYAMA CHEMICAL INDUSTRIES Co., Ltd.) was added thereto, nitrogen was stopped, and while the temperature was maintained at 190° C., the pressure was slowly reduced to 5 kPa. After 5 kPa was reached, the reaction was further carried out for 4 hours, and water thus produced was distilled off. The hydroxyl group value of the esterification product thus obtained was 114 mg KOH/g.

[Curing agent (B)]
b1-1: N-methyl diethanolamine (AMINOALCOHOL MDA manufactured by NIPPON NYUKAZAI CO., LTD., OHV=942 mg KOH/g, viscosity=75 mPa·s (25° C.), HLB=27.0)
b1-2: N-butyl diethanolamine (AMINOALCOHOL MBD manufactured by NIPPON NYUKAZAI CO., LTD., OHV=696 mg KOH/g, viscosity 56 mPa·s (25° C.), HLB=16.9)
b1-3: N-lauryl diethanolamine (NYMEEN L-202 manufactured by NOF CORPORATION, OHV=394 mg KOH/g, viscosity=100 mPa·s (25° C.), HLB=8.4)
b1-4: N-stearyl diethanolamine (NYMEEN S-202 manufactured by NOF CORPORATION, OHV=322 mg KOH/g, HLB=6.1)
b1-5: N,N-bishydroxypropyl-N-hydroxyethylamine (LEOCON MA-170 manufactured by Lion Corp., OHV=950 mg KOH/g, viscosity=3,000 mPa·s (25° C.), HLB=26.4)
b1-6: t-Butyl diethanolamine (AMINOALCOHOL tr-BDEA manufactured by NIPPON NYUKAZAI CO., LTD., OHV=696 mg KOH/g, solid at normal temperature, HLB=19.3)
b1-7: Lauryl polyoxyethylene amine (AMIET 105 manufactured by Kao Corporation, OHV=311 mg KOH/g, viscosity=110 mPa·s (25° C.), HLB=10.5)
b1-8: Stearyl polyoxyethylene amine (AMIET 320 manufactured by Kao Corporation, viscosity=250 mPa·s (25° C.), OHV=91 mg KOH/g, solid at normal temperature, HLB=14.0)
b1-9: Lauric acid diethanolamide (AMINON L-02 manufactured by Kao Corporation, OHV=373 mg KOH/g, solid at normal temperature, HLB=10.5)
b2-1: Castor oil (URIC H-30 manufactured by Itoh Oil Chemicals Co., Ltd., OHV=160 mg KOH/g, viscosity=690 mPa·s (25° C.), HLB=4.0)
b2-2: Partially dehydrated castor oil (URIC H-41 manufactured by Itoh Oil Chemicals Co., Ltd., OHV=120 mg KOH/g, HLB=3.4)
b3-1: N,N,N',N'-tetrakis[2-hydroxypropyl]ethylenediamine (EDP-300 manufactured by ADEKA Corporation, hydroxyl group value=760 mg KOH/g, viscosity=50,000 mPa·s (25° C.), HLB=22.5)
b3-2: Ethylene oxide/propylene oxide=40/60 adduct of ethylenediamine (BM-34 manufactured by ADEKA Corporation, hydroxyl group value=820 mg KOH/g, viscosity=7,500 mPa·s (25° C.), HLB=24.5)

Production Examples 1 to 13

(Production Example 1: Production of Base Agent (A-1))

Into a four-necked flask having a capacity of 2 liters, 193 g of a1-1 and 450 g of a1-2 were introduced, and the mixture was conditioned to 50° C. while being stirred under a nitrogen gas stream. Next, 269 g of a2-1 and 88 g of a2-2 were added thereto under stirring, and after heat generation of a urethanization reaction had subsided, the temperature was increased to 90° C. When the internal temperature was stabilized at 90° C., 0.1 g of a catalyst a3 was added thereto, and a reaction was carried out for 4 hours at 90° C. 0.14 g of a catalyst poison a4 was added thereto to terminate the reaction, and an isocyanate group-terminated prepolymer was obtained. Hereinafter, this will be referred to as "base agent (A-1)". With regard to the base agent (A-1), the isocyanate group (NCO) content in the isocyanate group-terminated prepolymer thus obtained was 13.5% by mass, and the viscosity at 25° C. was 3,330 mPa·s.

Production Examples 2 to 5, 12, and 13

Prepolymers were synthesized by an operation similar to that of Production Example 1, by changing the isocyanate components and the polyol components to the compositions shown in Table 3. In all cases, low-viscosity prepolymers as pale yellow transparent liquids were obtained. The characteristics of the prepolymers are shown in Tables 3 and 4.

Production Example 6

530 g of a1-1 was introduced into a four-necked flask having a capacity of 1 liter, and the temperature was controlled to 50° C. while the compound was stirred under a nitrogen gas stream. Next, 470 g of a2-7 was added thereto under stirring, and after heat generation of a urethanization reaction had subsided, a reaction was carried out for 3 hours at 75° C. Thus, prepolymer A-6 was obtained. The prepolymer A-6 was a pale yellow transparent liquid, and the viscosity at 25° C. was 3,450 mPa·s. The characteristics of the prepolymer are shown in Table 4.

Production Examples 7, 8, and 10

Prepolymers were synthesized by an operation similar to that of Production Example 6, by changing the isocyanate components and the polyol components to the compositions shown in Table 4. In all cases, low-viscosity prepolymers as pale yellow transparent liquids were obtained. The characteristics of the prepolymers are shown in Table 4.

Production Example 9

215 g of a1-4 was introduced into a four-necked flask having a capacity of 1 liter, and the temperature was controlled to 50° C. while the compound was stirred under a nitrogen gas stream. Next, 430 g of a2-5 was added thereto under stirring, and after heat generation of a urethanization reaction had subsided, a reaction was carried out for 3 hours at 75° C. Subsequently, 55 g of a1-1 and 300 g of a1-3 were added thereto, and the mixture was mixed and stirred until the mixture became uniform. Thus, prepolymer A-9 was obtained. The prepolymer A-9 was a pale yellow transparent liquid, and the viscosity at 25° C. was 4,700 mPa·s. The characteristics of the prepolymer are shown in Table 4.

Production Example 11 a1-3 (a carbodiimide-modification product of 4,4'-MDI; MILLIONATE MTL-C manufactured by Tosoh Corporation; isocyanate group content=28.6%) was prepared, and this was directly used as A-11.

TABLE 3

| | | Production Example 1 | Production Example 2 | Production Example 3 | Production Example 4 | Production Example 5 |
|---|---|---|---|---|---|---|
| Base agent | | A-1 | A-2 | A-3 | A-4 | A-5 |
| Composition | a1-1 (g) | 193 | 199 | 204 | 203 | 231 |
| | a1-2 (g) | 450 | 464 | 476 | 473 | 538 |
| | a2-1 (g) | 269 | — | — | — | — |
| | a2-2 (g) | 88 | — | — | — | — |
| | a2-3 (g) | — | 250 | 326 | 270 | — |
| | a2-4 (g) | — | 88 | — | — | — |
| | a2-5 (g) | — | — | — | 54 | — |
| | a2-6 (g) | — | — | — | — | 231 |
| | Catalyst a3 | 0.1 | 0.1 | 0.1 | 0.1 | 0.1 |
| | Catalyst poison a4 | 0.14 | 0.14 | 0.14 | 0.14 | 0.14 |
| Characteristics | NCO content (%) | 13.5 | 13.6 | 13.8 | 13.8 | 16.0 |
| | MDI monomer content (%) | 25.2 | 24.8 | 24.9 | 25.0 | 29.5 |
| | Viscosity (mPa · s@25° C.) | 3330 | 5140 | 1950 | 4120 | 3640 |

TABLE 4

| | | Production Example 6 | Production Example 7 | Production Example 8 | Production Example 9 | Production Example 10 | Production Example 11 |
|---|---|---|---|---|---|---|---|
| Base agent | | A-6 | A-7 | A-8 | A-9 | A-10 | A-11 |
| Composition | a1-1 (g) | 530 | 570 | 200 | 55 | 230 | — |
| | a1-3 (g) | — | — | 410 | 300 | 600 | 1000 |
| | a1-4 (g) | — | — | — | 215 | — | — |
| | a2-5 (g) | — | — | — | 430 | 170 | — |
| | a2-7 (g) | 470 | 430 | — | — | — | — |
| | a2-8 (g) | — | — | 390 | — | — | — |
| | a2-9 (g) | — | — | — | — | — | — |
| | a2-10 (g) | — | — | — | — | — | — |
| | Catalyst a3 | — | — | — | — | — | — |
| | Catalyst poison a4 | — | — | — | — | — | — |
| Characteristics | NCO content (%) | 12.2 | 14.0 | 15.1 | 15.7 | 22.9 | 28.5 |
| | MDI monomer content (%) | 24.9 | 30.5 | 32.6 | 15.1 | 55.0 | 69.4 |
| | Viscosity (mPa · s@25° C.) | 3450 | 1980 | 2400 | 4700 | 400 | 45 |

Preparation Examples 1 to 21

(Preparation Example 1: Preparation of Curing Agent (B-1))

65 parts by mass of the polyol b2-1, 10 parts by mass of b2-2, and 25 parts by mass of the polyol b3-1 were uniformly mixed, and a curing agent (B-1) was prepared. In the following description, this will be referred to as "curing agent (B-1)", and the characteristics of the agent are shown in Table 5.

Preparation Examples 2 to 21

Curing agents (B-2) to (B-21) were prepared by an operation similar to that of Preparation Example 1, by changing the respective polyols to the compositions shown in Table 5 and Table 6. The characteristics of the curing agents are shown in Table 5 and Table 6 (the units are parts by mass).

[Measurement of NCO Content]

With regard to the prepolymers A-1 to A-13 shown in Tables 3 and 4, the NCO content was carried out according to JIS K1603-1:2007.

[Measurement of Monomer Content of MDI]

With regard to the prepolymers A-1 to A-13 shown in Tables 3 and 4, the content (mass %) of monomers of MDI was determined by GPC measurement by the following conditions and method.

<Measurement Conditions>

Measuring apparatus: "HLC-8120 (trade name)" (manufactured by Tosoh Corporation)

Column: Columns respectively packed with three kinds such as TSKgel G3000HXL, TSKgel G2000HXL, and TSKgel G1000HXL (all trade names, manufactured by Tosoh Corporation) as packing agents were connected in series, and then measurement was made at a column temperature of 40° C.

Detector: RI (refractive index) meter

TABLE 5

| | | Preparation Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Curing agent | | B-1 | B-2 | B-3 | B-4 | B-5 | B-6 | B-7 | B-8 | B-9 | B-10 | B-11 |
| Composition | b1-1 | — | 4 | — | — | — | — | — | — | — | — | — |
| (parts by mass) | b1-2 | — | — | 4 | 10 | — | — | — | — | — | — | — |
| | b1-3 | — | — | — | — | 10 | — | 5 | 10 | 15 | 20 | — |
| | b1-4 | — | — | — | — | — | 10 | — | — | — | — | — |
| | b1-5 | — | — | — | — | — | — | — | — | — | — | 4 |
| | b2-1 | 65 | 62 | 60 | 52 | 52 | 52 | 18 | 38 | 70 | 65 | 60 |
| | b2-2 | 10 | 13 | 11 | 15 | 15 | 15 | 55 | 33 | — | — | 11 |
| | b3-1 | 25 | 21 | 24 | 23 | 23 | 23 | 22 | 19 | 15 | 15 | 24 |
| Characteristics | Viscosity (mPa·s@25° C.) | 1320 | 1020 | 1150 | 860 | 950 | 980 | 820 | 800 | 720 | 640 | 730 |
| | HLB | 8.6 | 8.7 | 8.9 | 9.5 | 8.6 | 8.4 | 8.0 | 7.8 | 7.4 | 7.7 | 9.2 |
| (Mb2)/(Mb3) | | 75/25 | 78/22 | 75/25 | 74/26 | 74/26 | 74/26 | 77/23 | 79/21 | 82/18 | 81/19 | 75/25 |
| Monoalkyl diethanolamine | | Absent | Present | Present | Present | Present | Present | Present | Present | Present | Present | Absent |

TABLE 6

| | | Preparation Example | | | | | | | | | |
|---|---|---|---|---|---|---|---|---|---|---|---|
| | | 12 | 13 | 14 | 15 | 16 | 17 | 18 | 19 | 20 | 21 |
| Curing agent | | B-12 | B-13 | B-14 | B-15 | B-16 | B-17 | B-18 | B-19 | B-20 | B-21 |
| Composition | b1-1 | — | — | — | — | — | — | — | — | — | — |
| (parts by mass) | b1-2 | — | — | — | — | — | — | — | — | — | — |
| | b1-3 | — | — | — | — | — | — | 10 | 10 | — | 10 |
| | b1-4 | — | — | — | — | — | — | — | — | — | — |
| | b1-5 | — | — | — | — | — | — | — | — | — | — |
| | b1-6 | 10 | — | — | — | — | — | — | — | 18 | — |
| | b1-7 | — | 10 | — | — | — | — | — | — | — | — |
| | b1-8 | — | — | 10 | — | — | — | — | — | — | — |
| | b1-9 | — | — | — | 10 | — | — | — | — | — | — |
| | b2-1 | 52 | 52 | 52 | 52 | 80 | 69 | 75 | 78 | 82 | 42 |
| | b2-2 | 15 | 15 | 15 | 15 | — | — | — | — | — | 33 |
| | b3-1 | 23 | 23 | 23 | 23 | 20 | 31 | 15 | 12 | — | 9 |
| | b3-2 | — | — | — | — | — | — | — | — | — | 6 |
| Characteristics | Viscosity (mPa·s@25° C.) | 880 | 990 | 1050 | 1140 | 1150 | 1600 | 800 | 650 | 570 | 720 |
| | HLB | 9.7 | 8.8 | 8.9 | 8.8 | 7.7 | 9.7 | 7.2 | 6.7 | 6.3 | 7.1 |
| (Mb2)/(Mb3) | | 74/26 | 74/26 | 74/26 | 74/26 | 80/20 | 69/31 | 83/17 | 87/13 | 100/0 | 83/17 |
| Monoalkyl diethanolamine | | Present | Absent | Absent | Absent | Absent | Absent | Present | Present | Present | Present |

Eluent: Tetrahydrofuran (THF) (flow rate: 1 mL/min, 40° C.)

Calibration curve: A calibration curve was obtained using polystyrenes of the following grades (TSK standard POLYSTYRENE; manufactured by Tosoh Corporation)

F-2 ($1.81 \times 10^4$) F-1 ($1.02 \times 10^4$) A-5000 ($5.97 \times 10^3$) A-2500 ($2.63 \times 10^3$) A-500 (Mw=$6.82 \times 10^2$, $5.78 \times 10^2$, $4.74 \times \times 10^2$, $3.70 \times 10^2$, $2.66 \times 10^2$) toluene (Mw=92)

Sample: A solution of 0.05 g of a sample in 10 mL of tetrahydrofuran

<Measurement Method>

First, a calibration curve was obtained from a chart obtained by detecting polystyrenes as standard substances by means of the refractive index differences. Next, for each of the samples, from a chart obtained by detecting by means of the refractive index difference based on the same calibration curve, the mass % of a peak near the peak top molecular weight (number average molecular weight) of 230, which represents the monomer of MDI, was determined.

[Production of Sample for Low-Molecular Weight Molecule Elution Test]

Examples 1 to 17 and Comparative Examples 1 to 18

The base agents (A-1) to (A-13) and the curing agents (B-1) to (B-21) were used in combination as shown in Tables 7 to 10, and a mixed liquid obtained by mixing a base agent and a curing agent such that the liquid temperature was 45° C., the isocyanate group/active hydrogen group=1.00 or 1.05 (molar ratio), and the total mass was 30 g, was stirred for 15 seconds. 10 g of glycerin was further added thereto (assuming the glycerin incorporated into hollow fibers), and the mixture was stirred for 15 seconds. Thus, a polyurethane resin cured product was obtained. This resin cured product was left to stand in a constant temperature chamber at a temperature of 50° C. and a time of 10 minutes as first curing conditions, and at a temperature of 45° C. and a time for 2 days as second curing conditions.

[Low-Molecular Weight Eluate Extraction Test]

The low-molecular weight eluate values of the resin cured products obtained in Examples 1 to 17 and Comparative Examples 1 to 18 were measured by the following method.

First, 20 g of a sample for measuring the low-molecular weight eluate value obtained in each of the Examples and Comparative Examples, which had been cut into a fan shape, was weighed, and the sample was immersed in 100 ml of purified water that had been warmed in advance to 40° C. and was left to stand for 2 hours at 40° C. Thus, a low-molecular weight eluate was extracted into the purified water. Next, a liquid obtained by decanting the extract thus obtained, introducing 10 ml into a 50-ml graduated flask, and adjusting the volume to 50 ml with purified water, was used as a test liquid, and measurement of the UV absorbance (SHIMADZU CORPORATION, UV-1500) was carried out. A one-tenth value of the maximum value of the absorbance at 240 to 245 nm was designated as the low-molecular weight eluate value. The low-molecular weight eluate value is preferably less than 0.07, and more preferably less than 0.065.

[Mixing Viscosity/Pot Life Test]

In Examples 1 to 17 and Comparative Examples 1 to 18, the mixing viscosity/pot life at the time of obtaining a resin cured product was determined by the following method.

A base agent and a curing agent, whose temperature had been adjusted in advance to 45° C., were weighed and mixed so as to obtain a total amount of 50 g at a blend resulting in an isocyanate group/active hydrogen group=1.00 (molar ratio), and the viscosity of the mixture was measured in an atmosphere at 25° C. using a rotary viscometer (type B, No. 4 rotor). The viscosity after a lapse of 60 seconds from the time point of initiating mixing of the base agent and the curing agent was designated as mixing viscosity, and the time taken by the viscosity of the mixture to reach 50,000 mPa·s was designated as pot life (second). When the pot life was 300 seconds or less, the sample was considered to have satisfactory rapid curability. Furthermore, when the mixing viscosity was 1,900 mPa·s or less, the sample was considered to have low viscosity.

[Hardness Measurement Test]

The hardness of the resin cured products obtained in Examples 1 to 17 and Comparative Examples 1 to 18 was measured by the following method.

For each of the measurement sample obtained in the Examples and Comparative Examples, the JIS-D hardness at the moment of measurement and after 10 seconds from the moment of measurement was measured under the temperature conditions of 25° C., by a method equivalent to the method described in JIS-K7312.

TABLE 7

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Base agent | A-1 | A-1 | A-1 | A-1 | A-2 | A-3 | A-4 | A-5 | A-5 | A-5 | A-5 |
| Curing agent | B3 | B4 | B5 | B6 | B5 | B5 | B5 | B7 | B8 | B9 | B10 |
| Base agent/curing agent (molar ratio) | 1.00 | 1.00 | 1.00 | 1.00 | 1.00 | 1.00 | 1.00 | 1.00 | 1.00 | 1.00 | 1.00 |
| MDI monomer content of base agent (%) | 25.2 | 25.2 | 25.2 | 25.2 | 24.8 | 24.9 | 25.0 | 29.5 | 29.5 | 29.5 | 29.5 |
| HLB of curing agent | 8.9 | 9.5 | 8.6 | 8.4 | 8.6 | 8.6 | 8.6 | 8.0 | 7.8 | 7.4 | 7.7 |
| (Mb2)/(Mb3) | 75/25 | 74/26 | 74/26 | 74/26 | 74/26 | 74/26 | 74/26 | 77/23 | 79/21 | 82/18 | 81/19 |
| Monoalkyl diethanolamine | Present | Present | Present | Present | Present | Present | Present | Present | Present | Present | Present |
| Low-molecular weight eluate value | 0.069 | 0.066 | 0.055 | 0.061 | 0.043 | 0.047 | 0.042 | 0.053 | 0.047 | 0.050 | 0.053 |
| Mixing viscosity (mPa · s) | 1240 | 1120 | 880 | 1030 | 1460 | 950 | 1360 | 1120 | 1260 | 870 | 900 |
| Pot life (sec) | 267 | 233 | 257 | 266 | 274 | 277 | 226 | 221 | 222 | 288 | 269 |
| Hardness (D hardness) moment value | 71 | 68 | 65 | 64 | 71 | 69 | 69 | 71 | 70 | 70 | 69 |

TABLE 8

| | Example | | | | | |
|---|---|---|---|---|---|---|
| | 12 | 13 | 14 | 15 | 16 | 17 |
| Base agent | A-6 | A-7 | A-8 | A-9 | A-1 | A-5 |
| Curing agent | B-8 | B-8 | B-18 | B-8 | B-12 | B-21 |
| Base agent/curing agent (molar ratio) | 1.00 | 1.00 | 1.00 | 1.00 | 1.00 | 1.00 |
| MDI monomer content of base agent (%) | 24.9 | 30.5 | 32.6 | 15.1 | 25.2 | 29.5 |
| HLB of curing agent | 7.8 | 7.8 | 7.2 | 7.8 | 9.7 | 7.1 |
| (Mb2)/(Mb3) | 79/21 | 79/21 | 83/17 | 79/21 | 74/26 | 83/17 |
| Monoalkyl diethanolamine | Present | Present | Present | Present | Present | Present |
| Low-molecular weight eluate value | 0.045 | 0.059 | 0.060 | 0.045 | 0.068 | 0.040 |
| Mixing viscosity (mPa·s) | 1450 | 1160 | 1040 | 1410 | 1210 | 1480 |
| Pot life (sec) | 266 | 271 | 218 | 254 | 240 | 206 |
| Hardness (D hardness) moment value | 57 | 62 | 58 | 65 | 68 | 70 |

TABLE 9

| | Comparative Example | | | | | | |
|---|---|---|---|---|---|---|---|
| | 1 | 2 | 3 | 4 | 5 | 6 | 7 |
| Base agent | A-1 | A-1 | A-2 | A-3 | A-4 | A-5 | A-1 |
| Curing agent | B-1 | B-2 | B-1 | B-1 | B-1 | B-1 | B-11 |
| Base agent/curing agent (molar ratio) | 1.00 | 1.00 | 1.00 | 1.00 | 1.00 | 1.00 | 1.00 |
| MDI monomer content of base agent (%) | 25.2 | 25.2 | 24.8 | 24.9 | 25.0 | 29.5 | 25.2 |
| HLB of curing agent | 8.6 | 8.7 | 8.6 | 8.6 | 8.6 | 8.6 | 9.2 |
| (Mb2)/(Mb3) | 75/25 | 78/22 | 75/25 | 75/25 | 75/25 | 75/25 | 75/25 |
| Monoalkyl diethanolamine | Absent | Absent | Absent | Absent | Absent | Absent | Absent |
| Low-molecular weight eluate value | 0.085 | 0.111 | 0.073 | 0.076 | 0.071 | 0.082 | 0.097 |
| Mixing viscosity (mPa·s) | 1530 | 1230 | 1790 | 1180 | 1640 | 1440 | 1500 |
| Pot life (sec) | 257 | 269 | 273 | 280 | 235 | 235 | 271 |
| Hardness (D hardness) | 68 | 68 | 74 | 73 | 73 | 75 | 76 |

TABLE 10

| | Comparative Example | | | | | | | | | | |
|---|---|---|---|---|---|---|---|---|---|---|---|
| | 8 | 9 | 10 | 11 | 12 | 13 | 14 | 15 | 16 | 17 | 18 |
| Base agent | A-1 | A-1 | A-1 | A-6 | A-7 | A-8 | A-9 | A-10 | A-11 | A-12 | A-13 |
| Curing agent | B-13 | B-14 | B-15 | B-17 | B-17 | B-16 | B-17 | B-19 | B-20 | B-16 | B-16 |
| Base agent/curing agent (molar ratio) | 1.00 | 1.00 | 1.00 | 1.00 | 1.00 | 1.00 | 1.00 | 1.00 | 1.05 | 1.00 | 1.00 |
| MDI monomer content of base agent (%) | 25.2 | 25.2 | 25.2 | 24.9 | 30.5 | 32.6 | 15.1 | 55.0 | 69.4 | 22.4 | 16.0 |
| HLB of curing agent | 8.8 | 8.9 | 8.8 | 9.7 | 9.7 | 7.7 | 9.7 | 6.7 | 6.3 | 7.7 | 7.7 |
| (Mb2)/(Mb3) | 74/26 | 74/26 | 74/26 | 69/31 | 69/31 | 80/20 | 69/31 | 87/13 | 100/0 | 80/20 | 80/20 |
| Monoalkyl diethanolamine | Absent | Absent | Absent | Absent | Absent | Absent | Absent | Present | Present | Absent | Absent |
| Low-molecular weight eluate value | 0.070 | 0.071 | 0.073 | 0.050 | 0.073 | 0.075 | 0.050 | 0.089 | 0.292 | 0.104 | 0.139 |
| Mixing viscosity (mPa·s) | 1260 | 1280 | 1320 | 2150 | 1830 | 1180 | 1940 | 410 | 170 | 300 | 450 |
| Pot life (sec) | 243 | 270 | 256 | 201 | 198 | 230 | 210 | 175 | 488 | 180 | 360 |
| Hardness (D hardness) | 65 | 65 | 69 | 62 | 66 | 60 | 70 | 56 | 66 | 69 | 50 |

According to an embodiment of the present invention, a composition for forming a polyurethane resin used for a membrane sealing material, having excellent rapid curability, low viscosity, and excellent castability, and capable of reducing a low-molecular weight eluate, which is a reaction product between MDI and glycerin; and a membrane sealing material and a membrane module using the composition can be provided. Therefore, the membrane sealing material according to an embodiment of the present invention can be suitably used as a membrane sealing material that constitutes medical, domestic, and industrial separation apparatuses.

The present invention has been described in detail by referring to particular embodiments; however, it is clear to those ordinarily skilled in the art that various modifications and corrections can be applied without deviating from the essence and scope of the present invention.

Meanwhile, the entire matters of the specification, claims, and abstract of Japanese Patent Application No. 2017-143363 filed on Jul. 25, 2017, and the entire matters of the specification, claims, drawings, and abstract of Japanese Patent Application No. 2018-138313 filed on Jul. 24, 2018 are incorporated herein and are introduced as a disclosure of the specification of the present invention.

REFERENCE SIGNS LIST

11: housing (main body unit), 13: hollow fiber membrane, 15: first fluid inlet port, 17: first fluid outlet port, 19: membrane sealing material.

The invention claimed is:

1. A composition for forming a polyurethane resin used for a membrane sealing material, comprising a base agent (A) and a curing agent (B),
   wherein the base agent (A) comprises an isocyanate group-terminated prepolymer (A1),
   the isocyanate group-terminated prepolymer (A1) is a reaction product between an isocyanate group-containing compound (a1) and an active hydrogen-containing compound (a2),
   the base agent (A) comprises diphenylmethane diisocyanate,
   a monomer content of the diphenylmethane diisocyanate is 35% by mass or less, and
   the curing agent (B) comprises a compound (b1) represented by Formula (1):

[Chem. 1]

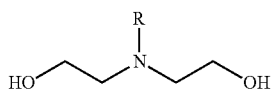

(1)

wherein R represents an alkyl group having 2 or more carbon atoms.

2. The composition for forming a polyurethane resin used for a membrane sealing material according to claim 1, wherein the isocyanate group-terminated prepolymer (A1) is an allophanate group-containing polyisocyanate.

3. The composition for forming a polyurethane resin used for a membrane sealing material according to claim 1, wherein R in Formula (1) is an alkyl group having 6 to 24 carbon atoms.

4. The composition for forming a polyurethane resin used for a membrane sealing material according to claim 1, wherein a hydrophilic-lipophilic balance (HLB) of the curing agent (B) is 9.0 or less.

5. The composition for forming a polyurethane resin used for a membrane sealing material according to claim 1,
   wherein the curing agent (B) comprises
   the compound (b1), at least one polyol (b2) selected from the group consisting of castor oil and a castor oil-based modified polyol, and a hydroxyl group-containing amine-based compound (b3) other than the compound (b1), and
   a mass ratio (Mb2)/(Mb3), that is the ratio of the content Mb2 of the polyol (b2) to the content Mb3 of the hydroxyl group-containing amine-based compound (b3), is from 70/30 to 90/10.

6. The composition for forming a polyurethane resin used for a membrane sealing material according to claim 1, wherein the active hydrogen-containing compound (a2) is an alkyl alcohol having 10 or more carbon atoms.

7. A membrane sealing material comprising a cured product of the composition for forming a polyurethane resin used for a membrane sealing material according to claim 1.

8. A membrane module comprising:
   a main body unit;
   a membrane; and
   a membrane sealing material sealing gaps between the main body unit and the membrane,
   wherein the membrane sealing material is the membrane sealing material according to claim 7.

9. The membrane module according to claim 8,
   wherein the membrane is a plurality of lines of hollow fiber membranes,
   the membrane sealing material seals the gaps between the main body unit and at least a portion of the plurality of lines of hollow fiber membranes, and at least a portion of the mutual gaps between the plurality of lines of hollow fiber membranes.

10. The composition of claim 1, wherein the content of the compound (b1) in the curing agent (B) is from 4% by mass to 25% by mass.

11. A composition for forming a polyurethane resin used for a membrane sealing material, comprising a base agent (A) and a curing agent (B),
    wherein the base agent (A) comprises
    at least one selected from the group consisting of
    a mixture of a modified or unmodified diphenylmethane diisocyanate and an isocyanate group-terminated prepolymer (A1-α), and an isocyanate group-terminated prepolymer (A1-β) comprising diphenylmethane diisocyanate as a constituent unit,
    the isocyanate group-terminated prepolymer (A1-α) is a reaction product between an isocyanate group-containing compound (a1-α) and an active hydrogen-containing compound (a2-α),
    the isocyanate group-terminated prepolymer (A1-β) is a reaction product between an isocyanate group-containing compound (a1-β) and an active hydrogen-containing compound (a2-β),
    a monomer content of the diphenylmethane diisocyanate in the base agent (A) is 35% by mass or less, and
    the curing agent (B) comprises a compound (b1) represented by Formula (1):

[Chem. 2]

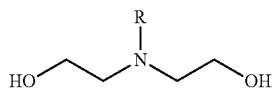

(1)

wherein R represents an alkyl group having 2 or more carbon atoms.

12. The composition for forming a polyurethane resin used for a membrane sealing material according to claim 11, wherein R in Formula (1) is an alkyl group having 6 to 24 carbon atoms.

13. The composition for forming a polyurethane resin used for a membrane sealing material according to claim 11, wherein a hydrophilic-lipophilic balance (HLB) of the curing agent (B) is 9.0 or less.

14. The composition for forming a polyurethane resin used for a membrane sealing material according to claim 11, wherein the curing agent (B) comprises
the compound (b1), at least one polyol (b2) selected from the group consisting of castor oil and a castor oil-based modified polyol, and a hydroxyl group-containing amine-based compound (b3) other than the compound (b1), and
a mass ratio (Mb2)/(Mb3), that is the ratio of the content Mb2 of the polyol (b2) to the content Mb3 of the hydroxyl group-containing amine-based compound (b3), is from 70/30 to 90/10.

15. The composition for forming a polyurethane resin used for a membrane sealing material according to claim 11, wherein active hydrogen-containing compound (a2-β) is an alkyl alcohol having 10 or more carbon atoms.

16. A membrane sealing material comprising a cured product of the composition for forming a polyurethane resin used for a membrane sealing material according to claim 11.

17. A membrane module comprising:
a main body unit;
a membrane; and
a membrane sealing material sealing gaps between the main body unit and the membrane,
wherein the membrane sealing material is the membrane sealing material according to claim 16.

18. The membrane module according to claim 17,
wherein the membrane is a plurality of lines of hollow fiber membranes,
the membrane sealing material seals the gaps between the main body unit and at least
a portion of the plurality of lines of hollow fiber membranes, and at least a portion of the mutual gaps between the plurality of lines of hollow fiber membranes.

19. The composition of claim 11, wherein the content of the compound (b1) in the curing agent (B) is from 4% by mass to 25% by mass.

* * * * *